Figure 32:
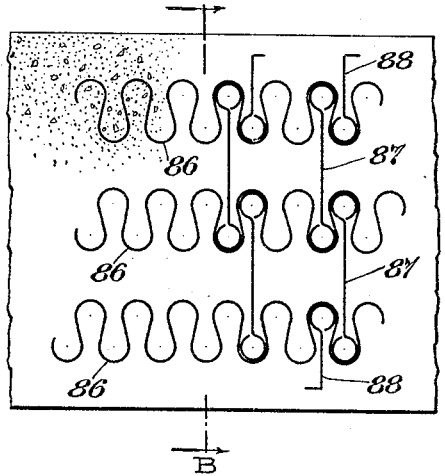

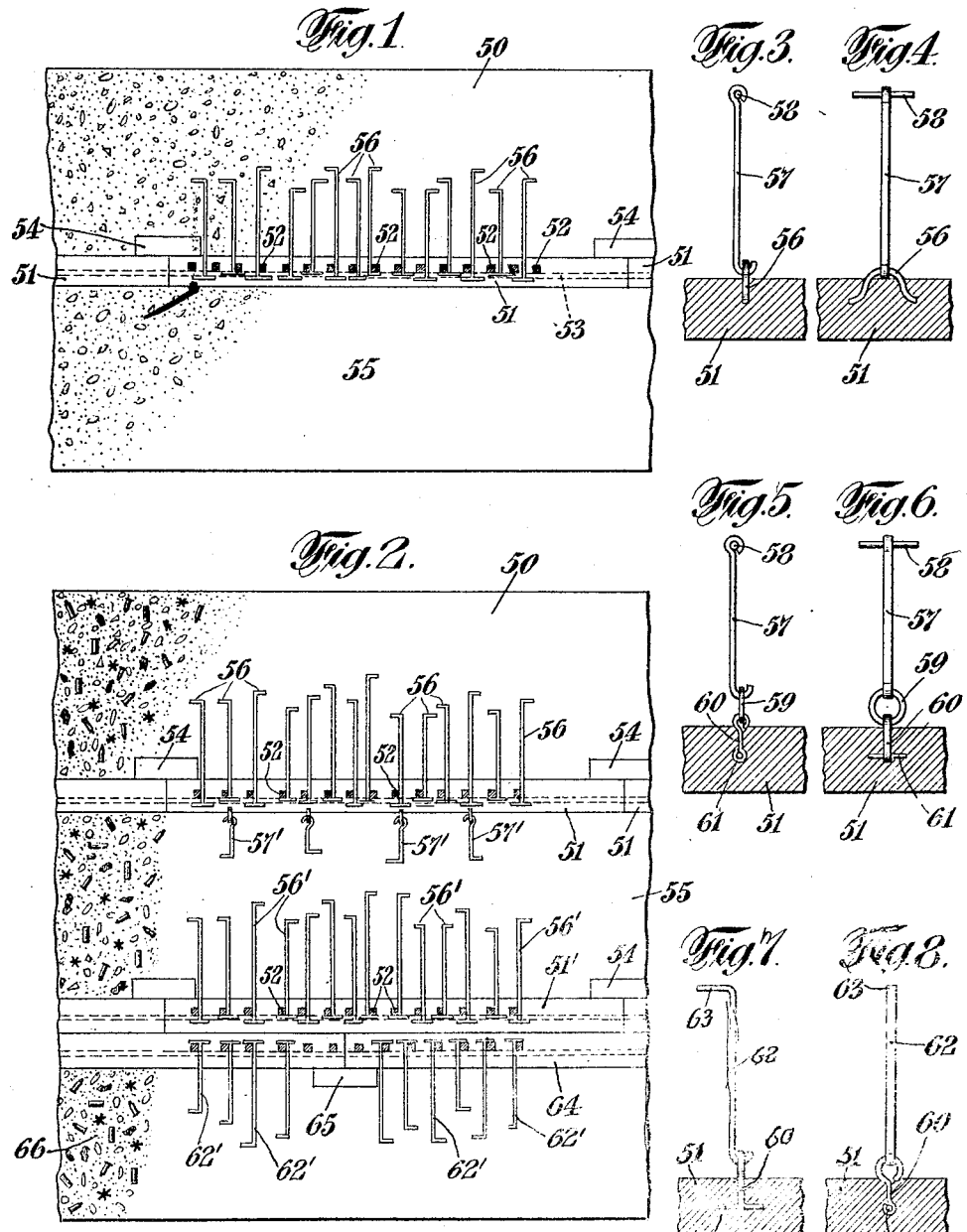

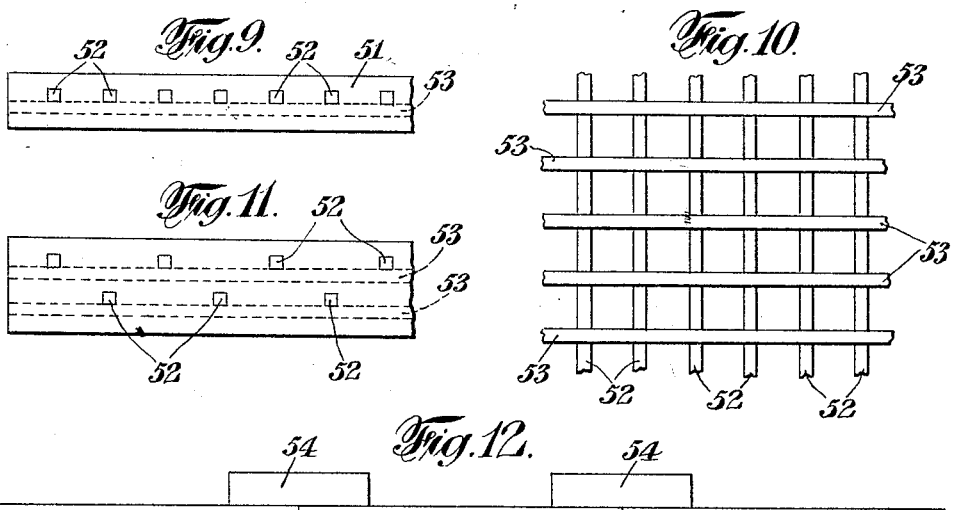
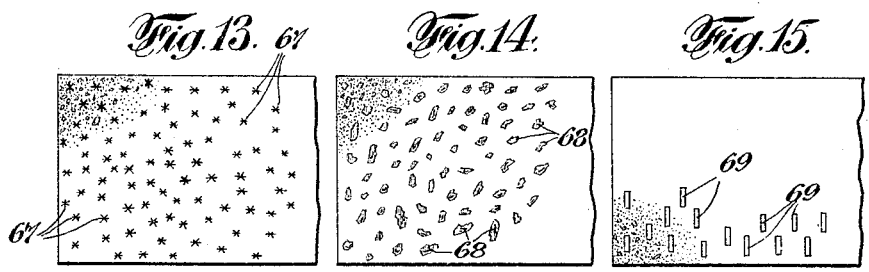
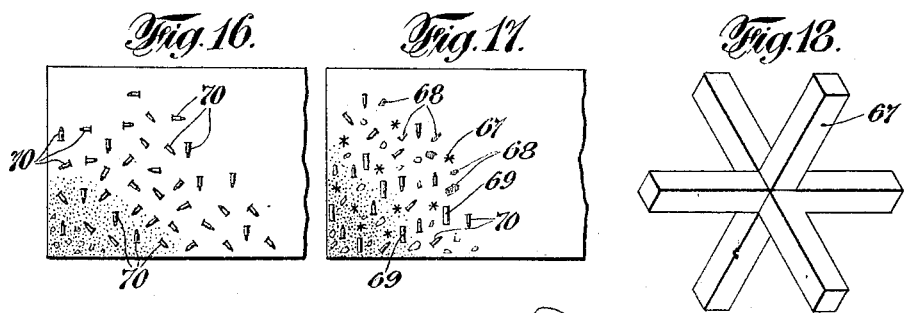
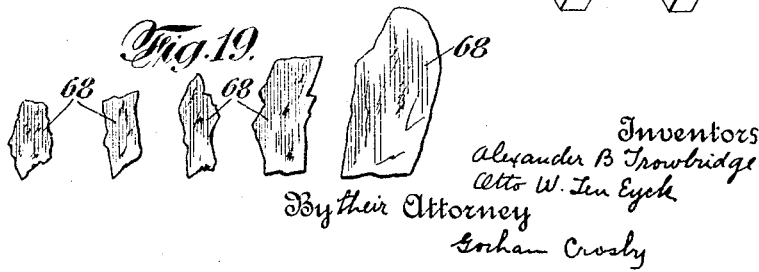

Nov. 20, 1923.  
A. B. TROWBRIDGE ET AL  
1,474,389  
WALL STRUCTURE  
Filed Dec. 11, 1920  
7 Sheets—Sheet 3
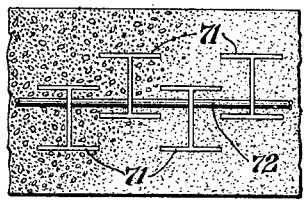
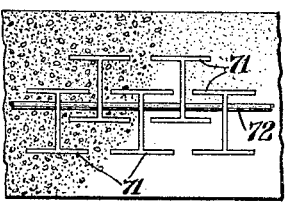
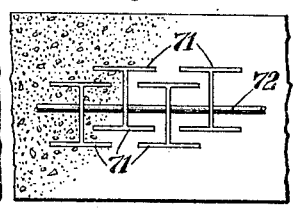
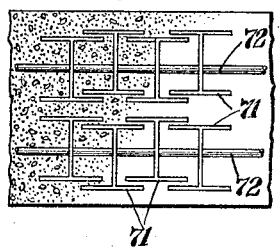
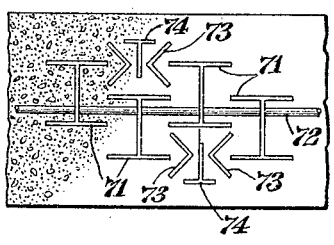
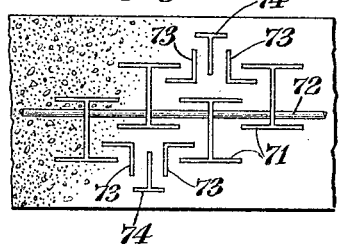
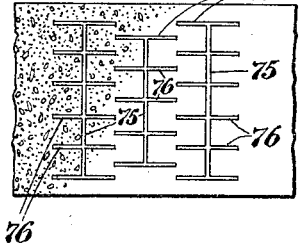
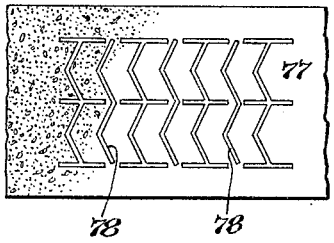
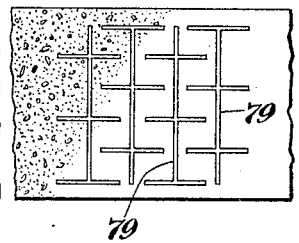
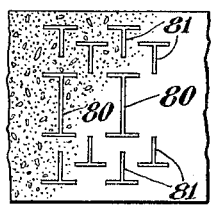
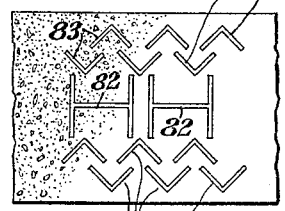
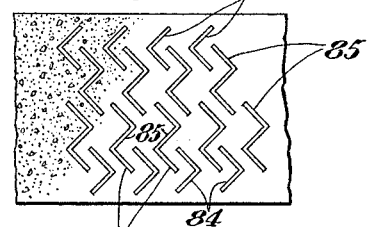
Inventors  
Alexander B. Trowbridge  
Otto W. Ten Eyck  
By their Attorney  
Gorham Crosby Nov. 20, 1923.                                                            1,474,389
                        A. B. TROWBRIDGE ET AL
                           WALL STRUCTURE
                        Filed Dec. 11, 1920        7 Sheets-Sheet 5
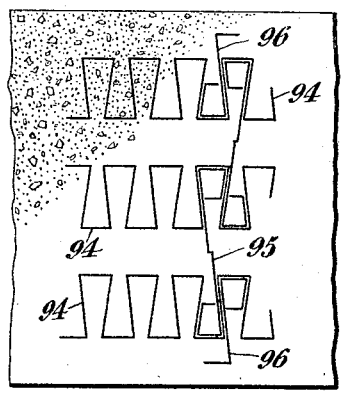
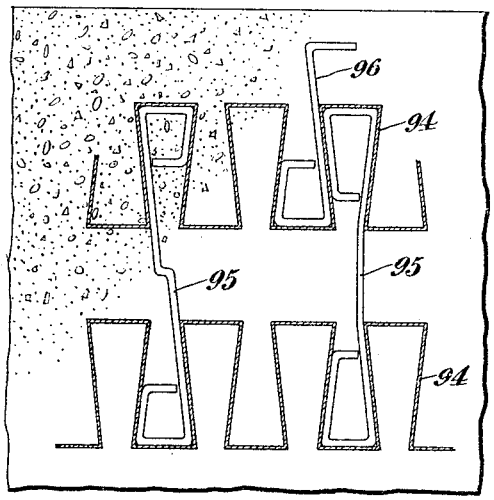
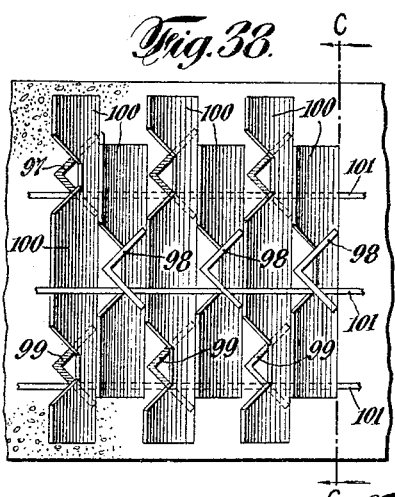
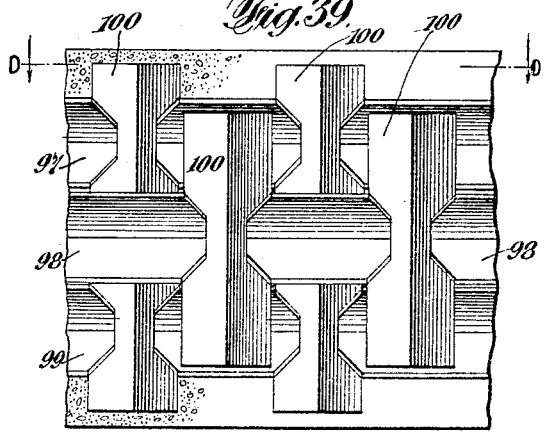
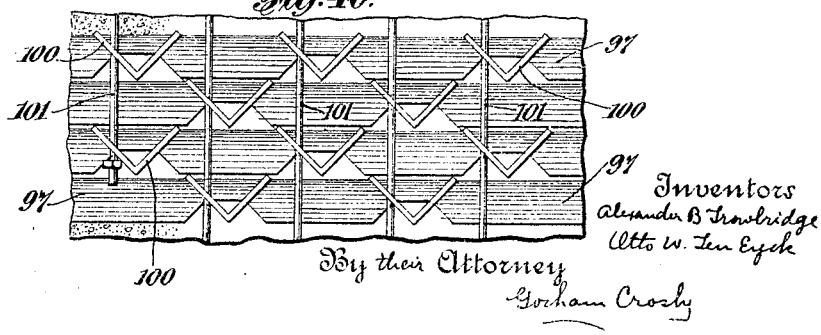

Nov. 20, 1923.  A. B. TROWBRIDGE ET AL  1,474,389
WALL STRUCTURE
Filed Dec. 11, 1920    7 Sheets-Sheet 6
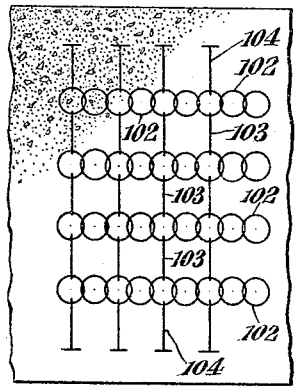
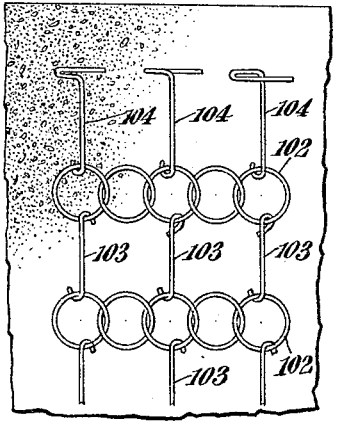
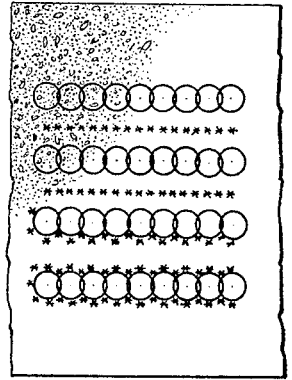
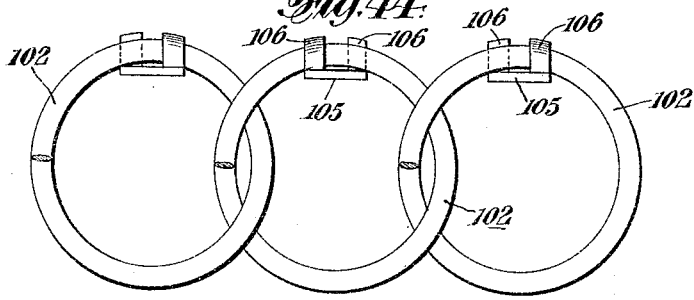
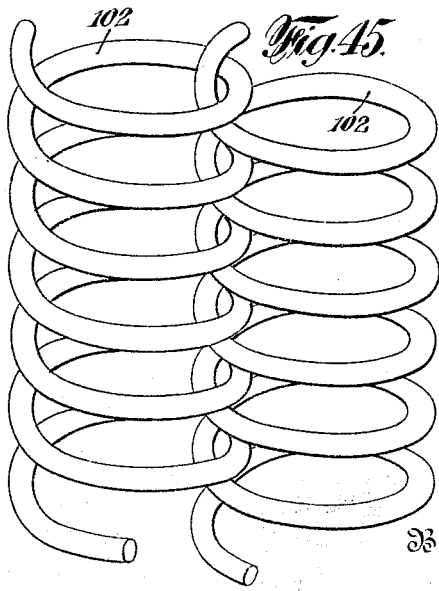
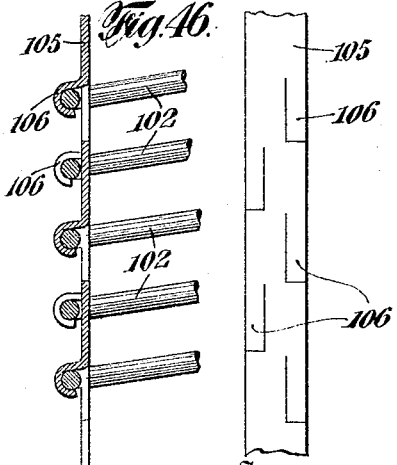
Inventors
Alexander B. Trowbridge
Otto W. Ten Eyck
By their Attorney
Gorham Crosby Nov. 20, 1923.  
A. B. TROWBRIDGE ET AL  
1,474,389  
WALL STRUCTURE  
Filed Dec. 11, 1920  7 Sheets-Sheet 7
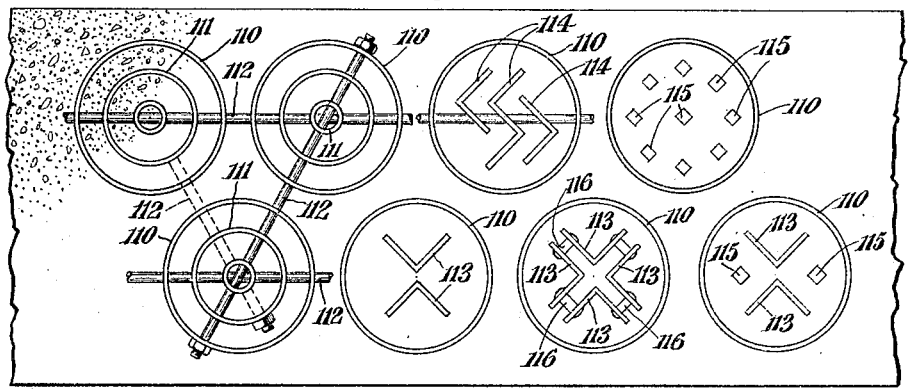
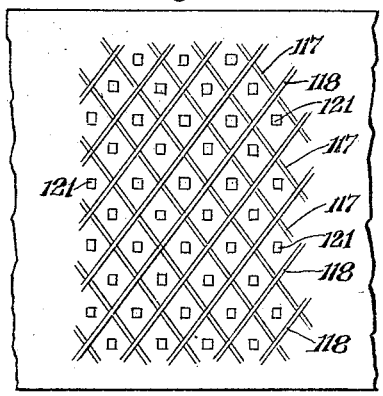
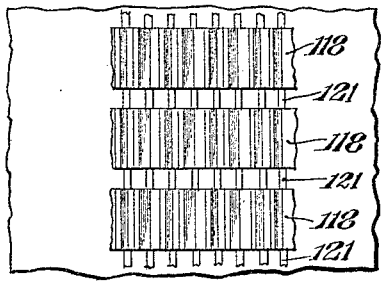
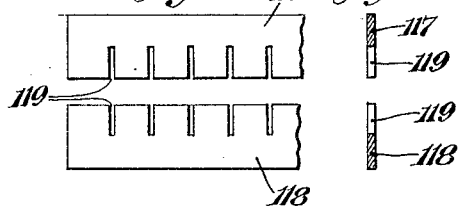
Inventors  
Alexander B. Trowbridge  
Otto W. Ten Eyck  
By their Attorney  
Gorham Crosby Patented Nov. 20, 1923.

1,474,389

UNITED STATES PATENT OFFICE.

ALEXANDER B. TROWBRIDGE, OF FLUSHING, NEW YORK, AND OTTO W. TEN EYCK, OF GLEN RIDGE, NEW JERSEY.

WALL STRUCTURE.

Application filed December 11, 1920. Serial No. 429,839.

*To all whom it may concern:*

Be it known that we, ALEXANDER B. TROWBRIDGE and OTTO W. TEN EYCK, citizens of the United States, and residents of Flushing, in the county of Queens and State of New York, and Glen Ridge, county of Essex, State of New Jersey, respectively, have invented certain new and useful Improvements in Wall Structures, of which the following is a specification.

The invention relates to improvements in wall structures and more particularly to wall structures adapted for bank or safety deposit vaults. It has heretofore been common to build the walls of such vaults with a layer of concrete on the outside and a layer of metal or metallic lining on the inside. Even although the concrete layer on the outside be extremely thick and the metal lining also be very thick, it is found that with modern drills, it is relatively easy to drill into the concrete sufficient to enable one to place a blasting charge therein and blow out a hole in the concrete layer sufficiently large for a man to enter, and with modern torches it is relatively easy to burn out a section of the metal lining thereby forming a large aperture through the entire wall. Even if the concrete layer be reinforced with a row of iron or steel bars, it is comparatively easy to blast away the concrete up to these bars and then burn them away with torches or the like. The main object of the present invention is to provide improvements in such wall structures which will greatly increase the time necessary to penetrate through them and thereby make the vault or space enclosed by the wall structure far more burglar or mob proof.

Further and more specific objects, features and advantages will more clearly appear from the detail description given below taken in connection with the accompanying drawings which form a part of this specification.

Figure 33:
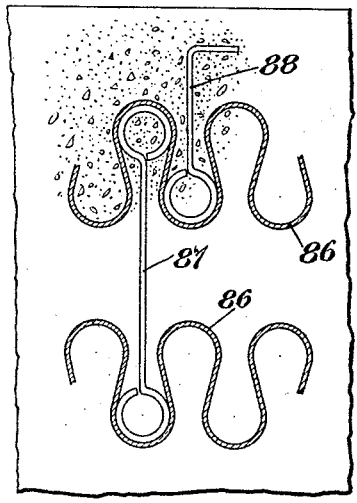
Figure 34:
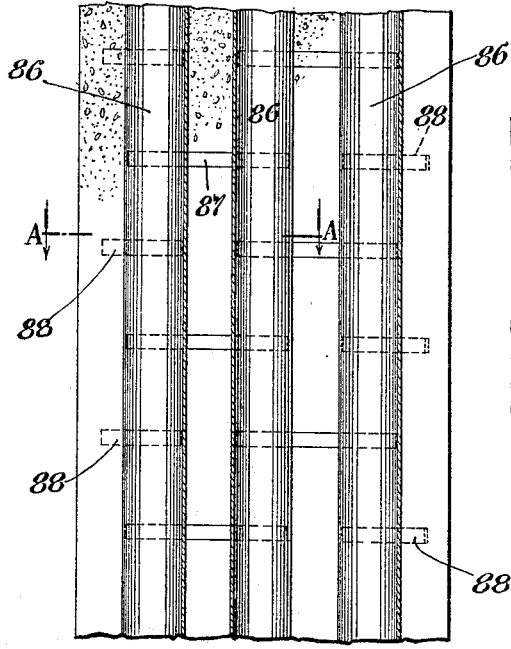
Figure 35:
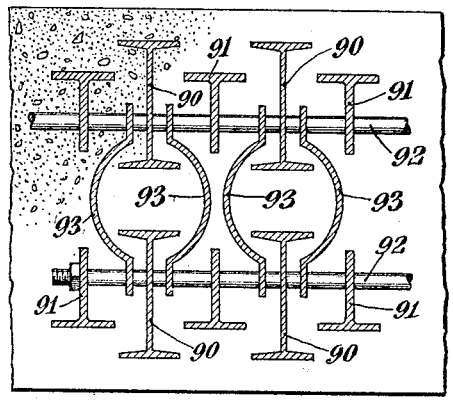

In the drawings, Fig. 1 is a detail horizontal section of a vertical wall structure illustrating certain of our improvements in one form. Fig. 2 is a similar view illustrating a modification embodying further features. Figs. 3 and 4 are details showing a modified form of anchoring device for anchoring the metallic slabs of Figs. 1 and 2, Fig. 4 being a view of the arrangement taken at right angles to that shown in Fig. 3. Figs. 5 and 6 are similar views showing a further modification of the anchoring arrangement. Figs. 7 and 8 are similar views showing a further modification. Fig. 9 is a detail edge view of one of the metallic slabs of Figs. 1 and 2. Fig. 10 is a detail view illustrating the arrangement of the steel reinforcing bars cast in the metallic slabs of Figs. 1, 2 and 9. Fig. 11 is a similar view showing a modification which may be used in place of the slabs shown in Figs. 1 and 2. Fig. 12 is a detail view showing a layer of the metallic slabs with members overlapping the joints therebetween. Fig. 13 is a detail section of the concrete layers in Figs. 1 and 2, showing a certain form of steel members scattered therethrough. Fig. 14 is a similar view illustrating chips of steel scattered through the concrete. Fig. 15 is a similar view illustrating explosive charges scattered through the concrete. Fig. 16 is a similar view illustrating cartridges scattered through the concrete and Fig. 17 is a similar view illustrating the steel members, steel chips, explosive charges and cartridges all scattered through the concrete layers of Figs. 1 and 2. Fig. 18 is a detail view illustrating the preferred form of steel members shown in Fig. 1 and in Fig. 13. Fig. 19 is a detail showing irregular shaped pieces of steel shown in Fig. 1 and in Fig. 14. Fig. 20 is a section similar to Figs. 13 to 17 illustrating one method of reinforcing all of the concrete layers of Figs. 1 and 2. Figs. 21, 22, 23, 24, 25, 26, 27, 28, 29, 30 and 31 are similar views illustrating further modifications of the same. Fig. 32 is a similar view illustrating a still further modification in which corrugated sheets of metal are used for reinforcing the concrete layers shown in Figs. 1 and 2. Fig. 33 is an enlarged detail of the same taken on the line A—A of Fig. 34. Fig. 34 is a vertical transverse section taken on the line B—B of Fig. 32. Fig. 35 is a detail view similar to Figs. 20 to 32 inclusive illustrating a further method of reinforcing the concrete layers shown in Figs. 1 and 2. Fig. 36 is a similar view illustrating a further modification in which sheets of corrugated metal are used in reinforcing the concrete layers of Figs. 1 and 2. Fig. 37 is an enlarged sectional detail of the same. Fig. 38 is a view similar to Figs. 20 to 32 illustrating a further method of reinforcing the concrete layers of Figs. 1 and 2. Fig. 39 is a section taken on the line C—C of Fig. 38. Fig. 40 is a section taken on the line D—D of Fig. 39. Fig. 41 is a detail section similar to Figs. 20 to 32 illustrating a further arrangement for reinforcing the concrete walls of Figs. 1 and 2. Fig. 42 is a detail section of the same on a larger scale. Fig. 43 is a detail section similar to Fig. 41 but illustrating a further arrangement. Fig. 44 is a detail plan view of the spiral or spring members shown in Figs. 41 to 43. Fig. 45 is a detail elevation of the spring members. Fig. 46 is a vertical section illustrating the method of independently securing the loops of the spiral members. Fig. 47 is a detail vertical view of a section of one of the members for independently securing the loops shown in Fig. 46. Fig. 48 is a detail section similar to Figs. 20 etc. illustrating further methods of reinforcing the concrete layers of Figs. 1 and 2. Fig. 49 is a similar view illustrating a further method of reinforcing the concrete layers of Figs. 1 and 2. Fig. 50 is a detail vertical section of the arrangement shown in Fig. 49. Fig. 51 is a detail view of the members for making up the lattice work of Figs. 49 and 50. Fig. 52 is a transverse section of the members shown in Fig. 51.

Referring first to Fig. 1 we there show a wall structure composed of a relatively thick layer of concrete 50 and adjacent thereto a tough metallic layer made up of a plurality of cast iron slabs 51. These cast iron slabs may have mixed therewith about 5 to 25% of copper which makes burning thereof more difficult. The cast iron slabs 51 are preferably reinforced by a row of vertical steel rods 52 and a row of horizontal steel rods 53 cast in the cast iron slabs 51 forming a sort of steel grating cast within the slabs which grating has the appearance shown in Fig. 10. The joints between the ends of the slabs 51 may be overlapped with relatively narrow cast iron slabs 54 as more clearly illustrated in Fig. 12. On the outside of the layer of metallic slabs 51 we place another concrete layer 55 running parallel with the vault wall on the outside thereof. As shown in Fig. 1 we also provide a plurality of anchor members 56 having one end with an anchoring part thereon cast within the cast iron slab 51 so as to be firmly attached thereto. These anchor members extend out into the concrete layer 50 and are firmly embedded therein having their inner ends bent so that they firmly anchor each slab at a plurality of points to the concrete layer 50.

By this arrangement it will be seen that should the outer concrete layer 55 on the outside of the wall or vault be blasted away and a cut be made with a torch or the like cutting out a section of the tough metallic layer, yet when such section is cut around it cannot removed because of the plurality of anchors 56 which still hold it firmly anchored to the concrete layer 50 on the inside. By thus anchoring the metallic layer to an inner concrete layer, one would have to practically burn up an entire section of the metallic layer in order to get at the concrete layer on the inside and cannot simply cut around a piece the size of a manhole and then pull it away to expose a large area of the inner concrete layer. Furthermore even if the metallic slabs were not thus anchored to the inner concrete layer at the back this inner concrete layer materially retards the cutting away, by torch burning, of a section of the metal layer because when the torch is applied the molten metal will not run away from the back or inside of the metallic layer because of the presence of the concrete layer and all of the molten or burnt metal will have to run out or away at the front which materially retards the process of burning or cutting away such a section of the metallic layer. Referring to Figs. 3 and 4 we there show a modified form of anchoring means for anchoring the metallic slabs to the concrete layer. In this arrangement U shaped members 56 have their ends cast within and thereby anchored within the cast iron slabs 51 and anchor members 57 are hooked under the U shaped members 56 and provided with cross arms 58 at their outer ends which serve to anchor the whole firmly to the concrete layer. In Figs. 5 and 6 we show a slightly different arrangement in which rings 59 are anchored to the cast iron slabs 51 by members 60 hooking over pins 61, cast within the slabs 51 and the anchor members 57 are hooked in the rings 59. In Figs. 7 and 8 we show a slightly different arrangement in which the link members 60 are provided with an enlarged eye on the outside of the metallic slabs 51 and anchor members 62 are hooked therein which anchor members are simply provided with a right angle bend 63 at their inner ends to firmly anchor the metallic slabs to the concrete layer.

Referring to Fig. 2 we there show an arrangement which is similar to Fig. 1 except that two layers of tough cast iron slabs 51 and 51'. 64, are provided with an intermediate layer of concrete 55 between and an outer layer of concrete 66 whereby the wall is made up of three layers of concrete with intermediate or alternate layers of cast iron slabs or the like. In this arrangement the intermediate layer of concrete 55 has the anchors 56' embedded therein for anchoring the metallic slabs 51' thereto and also anchors 57' for anchoring the slabs 51 thereto. The slabs 51' are in all respects similar to the slabs 51 and are reinforced in the same way by rows of steel rods. Also in this arrangement we show an additional layer of tough metallic or cast iron slabs 64 with the joints overlapped by cast iron members 65, the slabs 64 being reinforced by rows of steel rods as shown in Figs. 9 and 10 and which may be anchored to the concrete 66 by anchors 62'. Therefore, in this arrangement between the intermediate concrete layer 55 and the outer concrete layer 66 we have provided a layer of tough metallic slabs of double thickness of that shown in Fig. 1. Instead of making either or both of these layers of metallic slabs as shown in Figs. 1 and 2 either or both of them may be formed of relatively thick slabs as shown in Fig. 11 with two rows of steel rods 53 running in one direction and two rows of steel rods 52 running in another direction, both rows of rods being cast within each cast iron slab. In order to make the concrete layers 50, 55 and 66 more difficult to drill into, we preferably scatter through the concrete of these layers small steel members. These steel members may be in various forms, one of which we prefer is the form of a jackstone as illustrated in Figs. 13 and 18, and which we have denoted by No. 67. Instead of using this form of steel members which serve to increase the time necessary to drill into the concrete, we may use pieces of steel 68 of irregular size and shape scattered throughout the concrete mass as illustrated in Fig. 14, the pieces being shown in detail in Fig. 19. Also in order to deter as far as possible the drilling into these concrete layers, we preferably scatter throughout the concrete thereof, explosive charges 69 as illustrated in Fig. 15. These explosive charges may consist of nitro-glycerine, dynamite or T. N. T. with suitable detonators wrapped in paraffin or metal cylinders. Instead of using such explosive charges ordinary cartridges 70 may be used as illustrated in Fig. 16. And if desired all of these various forms of steel members 67, 68 and explosive charges 69 and cartridges 70 may be used conjointly throughout the layers of concrete 50, 55 and 66 as illustrated in Fig. 17 as well as in Fig. 2. Not only do the steel members make the drilling more difficult and prolong the same, but the explosive charges or cartridges when encountered by such drilling will explode and tend to injure anyone attempting to penetrate the wall in this manner.

Besides having the various members shown in Fig. 17 scattered throughout the concrete of the layers 50, 55 and 66, these concrete layers may also be reinforced with iron or steel bars or beams which make it more difficult to blast away the concrete layers and greatly increase the time necessary to penetrate the wall. Various arrangements for thus reinforcing the concrete layers 50, 55 and 66 are shown in Figs. 20 to 31 inclusive. In Fig. 20 assuming the wall to be a vertical wall, it will be noted that the wall is reinforced with vertical I-beams 71 placed in staggered relation and tied together by horizontal rods 72. In Fig. 21 the arrangement is substantially the same except that the I-beams are placed closer together. In Fig. 22 the arrangement is substantially the same except that the I-beams 71 are differently spaced. In Fig. 23 a similar arrangement is shown except that there are two rows of I-beams 71 for reinforcing each concrete layer. In Fig. 24 we show a reinforcing arrangement combining the use of I-beams or H-columns 71 with angle bars 73 and T-beams 74. In Fig. 25 a similar arrangement is shown except that the reinforcing bars are differently arranged. In Fig. 26 another arrangement for reinforcing the concrete layers 50, 55 and 56 is shown in which each reinforcing member is provided with a central rib 75 with laterally extending ribs 76, the ribs 76 of one member alternating with the ribs 76 of an adjacent member. In Fig. 27 is shown another arrangement for reinforcing these concrete layers in which members 77 and 78 of irregular shape are used for the reinforcement. The arrangement shown in Fig. 28 is similar to that shown in Fig. 26 except that the reinforcing bars 79 are of slightly different construction. In Fig. 29 we show an arrangement for reinforcing the concrete layers 50, 55 and 66 in which a combination of I-beams 80 and T-beams 81 are used. In Fig. 30 is shown another arrangement for reinforcing the concrete layers 50, 55 and 66 in which H-bars 82 and angle bars 83 are used. In Fig. 31 is shown an arrangement in which the concrete layers 50, 55 and 66 are reinforced by a combination of angle bars 84 and Z-bars 85. In all of these figures, 20 to 31 inclusive, it will be noted that the concrete layers are provided with a plurality of reinforcing members disposed so that a plurality of said members is intersected by any straight line passing through the concrete layer so that no matter in what direction one attempts to drill into the concrete layer, a plurality of these iron or steel reinforcing members will be encountered by the drill in penetrating through the layer.

Referring to Fig. 32 we there show another arrangement which may also be used for reinforcing the concrete layers 50, 55 and 66 in which sheets of corrugated metal 86 are used, the corrugated metal sheets running parallel to the wall and being embedded in the concrete, the corrugations being narrower at the mouth thereof than at the body of the corrugations which makes it difficult to remove the concrete from within the corrugations, and anchor members 87 are provided for anchoring the corrugated sheets to one another and anchor members 88 are provided for anchoring the outer corrugated metal sheets further with respect to the concrete layer. These anchor members 87 and 88 are provided with enlarged ends which fit within the corrugations and which are larger than the mouths thereof so that they are not easily removed therefrom. These details are more clearly shown in Figs. 33 and 34. In Fig. 35 we show a still further arrangement for reinforcing the concrete layers 50, 55 and 66 employing not only I-beams 90 and T-beams 91, arranged in two rows each row interlocked with cross tie rods 92 and also the two rows are connected together by corrugated plates or semi-cylindrical bars 93, the tie rods 92 passing through apertures in the side edges of the bars 93.

Referring to Figs. 36 and 37 we there show an arrangement similar to that shown in Figs. 32 and 33 except that the corrugated metal sheets 94 have their corrugations made angular in shape instead of rounded. The various sheets are anchored together by anchor members 95 and the outer sheets being further anchored to the concrete by anchor members 96.

In Figs. 38, 39 and 40 a further arrangement for reinforcing the concrete layers is shown in which the wall is provided with rows of angle bars 97, 98 and 99 extending in one direction in the wall and rows of angle bars 100 extending transversely thereof. The angle bars are slotted or cut away so that they interlock with one another and are further tied together by tie rods 101. In Figs. 41 and 42 we show a still further arrangement for reinforcing the concrete layers 50, 55 and 66 in which a plurality of rows of spiral members 102 are used. The spiral members 102 are preferably interlocked with one another to form a connected row thereof as more clearly shown in Figs. 42, 44 and 45. The various rows may be anchored together by anchor members 103, and also independent anchors may be provided for anchoring the outer rows independently to the concrete as at 104. The various loops of each spiral member may be independently connected together by means of vertical members 105 shown more clearly in Figs. 44, 46 and 47. The members 105 are provided with stamped out hook shaped parts 106, which are adapted to engage over and firmly secure thereto the independent loops of the spiral members 102. In Fig. 43 we show series of interlooped metal rings and with rows of steel members such as jack stones 67 for delaying the drilling of the concrete or the rings may be in the form of spirals 102 so that the concrete layer is not only reinforced but made very difficult to drill into because of the presence of the steel members and the rings which may also be made of steel.

In Fig. 48 we show several arrangements by which the concrete layers of the wall may be reinforced with iron pipes 110. Some or all of the iron pipes may be provided with smaller iron pipes 111 therein, and the various pipes 110 and 111 tied together by cross bolts 112. It will be understood that the various pipes are filled with concrete the same as on the outside of the pipes. Some or all of the pipes instead of having the similar pipes on the inside may be reinforced on the inside by angle bars 113 or angle bars 114. Likewise they may be reinforced on the inside with steel rods 115 as well as angle bars 113. Some or all of the pipes may be reinforced on the inside by angle bars 113 bolted together by bolts 116. In the arrangement shown in Fig. 49 the concrete of layers 50, 55 and 66 are reinforced by layers of lattice work made up of bars 117 extending in one direction and bars 118 extending in another direction, the bars being slotted at 119 so as to interlock with one another and form a sort of grating with diamond shaped openings. These latticework gratings are preferably stacked one upon another as shown in Fig. 50 being separated by cross bars to space them apart. Down through the lattice work openings in the gratings we preferably put steel rods 121 so that the whole reinforcement is firmly bound together.

It will be understood that any one or more of the forms of reinforcement (shown in Figs. 20 to 52 inclusive) for the concrete layers 50, 55 and 66 may be used in combination with any one or more of the forms shown in Figs. 13, 14, 15, 16 and 17 for making the drilling and blasting away of the concrete layers more difficult. Also many other changes and modifications may be made and the various arangements shown combined in various other ways without departing from the spirit and scope of the invention in its broader aspects.

What we claim as new and desire to secure by Letters Patent is:

1. A wall structure having in combination a plurality of concrete layers with layers of tough metal slabs therebetween, and a plurality of anchors extending from each slab into the concrete for different distances, said anchors being embedded in the concrete and having lateral extensions in the concrete layers, the metal slabs having a plurality of rows of steel rods running in one direction therein and a plurality of rows of steel rods running in another direction therein, the concrete layers having pieces of hard steel and explosive charges scattered therein, and said concrete layers having different metal reinforcing members embedded therein including metal links, angle irons and bars, and also corrugated metal sheets running parallel to the wall, some of which are connected together by metal connecting means.

2. A wall structure having a concrete layer running parallel with the wall and a plurality of corrugated metal sheets running parallel to the wall and embedded in the concrete, the corrugations being narrower at the mouth thereof than at the body of the corrugations.

3. A wall structure having a concrete layer running parallel with the wall, and a plurality of corrugated metal sheets running parallel to the wall and embedded in the concrete, the corrugations being narrower at the mouth thereof than at the body of the corrugations, and means for anchoring the respective corrugated sheets to one another.

Signed at New York in the county of New York and State of New York this 10th day of December A. D. 1920.

ALEXANDER B. TROWBRIDGE.
OTTO W. TEN EYCK.